Jan. 16, 1968   P. J. YATCKO   3,364,385
AUTOMOBILE HEADLAMP SYSTEM WITH A CONTINUOUSLY ENERGIZED
FILAMENT PAIR TO PROVIDE ILLUMINATION WITHOUT
VISIBLE JUMPING EFFECT
Filed Oct. 22, 1965

WITNESSES
Theodore F. Wrobel
Blair R. Stuhlbach

INVENTOR
Paul J. Yatcko
BY
W.P. Palmer
ATTORNEY

3,364,385
AUTOMOBILE HEADLAMP SYSTEM WITH A CONTINUOUSLY ENERGIZED FILAMENT PAIR TO PROVIDE ILLUMINATION WITHOUT VISIBLE JUMPING EFFECT
Paul J. Yatcko, Livingston, N.J., assignor to Westinghouse Electric Corporation, Pittsburgh, Pa., a corporation of Pennsylvania
Filed Oct. 22, 1965, Ser. No. 502,215
2 Claims. (Cl. 315—83)

ABSTRACT OF THE DISCLOSURE

An automobile headlamp system employing first and second pairs of spaced headlamps mounted on the front of a vehicle and operable in a first condition to produce low beam illumination with one of the pairs and switchable to a second condition to add the illumination of the second pair of headlamps to that of the first pair, while the first pair remains continuously energized, to provide high beam illumination without any jumping visible beam effect during transition from one beam to the other.

---

Figure 1:
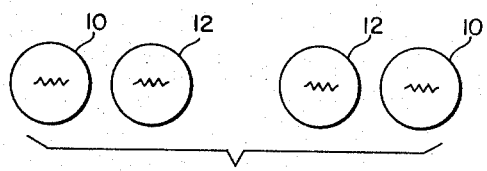

The present invention relates to an automobile headlamp system and more especially to such a system in which greater highway illumination under all driving conditions is obtained with a minimum of glare to the operator of an approaching vehicle and wherein transition from one lighting condition to another is readily made with an entire absence of jumping effect.

All present type motor vehicles utilize a dual-beam system with the high-beam employed for highway driving and the low-beam for city driving. To this end the motor vehicle is usually provided with a pair of five and three-quarter inch headlamps positioned on the front of the vehicle adjacent each of the front fenders and disposed in a vertical or horizontal position according to the dictates of the vehicle design by each individual manufacturer. A foot operated dimmer switch is usually provided, which in one position enables a filament of one lamp of each pair to be energized for low beam operation and when moved to its other position causes the energization of the other lamps of each pair or other filaments of the same lamps, or both, for high beam illumination, with an attendant pronounced jumping effect in the transition from one illumination level to the other. Also such existing systems usually represent a compromise between optimum high beam and low beam illumination which frequently results in much greater-than-desired illumination under low beam operation, particularly for driving in well lighted cities. On heavily traveled expressways present high beam systems cause a glare to be projected across the median and consequently drivers resort to the low beam system which in many instances results in over-driving of the lighting effectiveness.

It is accordingly the object of the present invention to provide an automobile headlamp system of increased illumination under high beam and low beam operation with each being designed specifically to give best illumination for the condition intended.

Another object of the present invention is the provision of a headlamp system for motor vehicles which produces greater illumination by the utilization of two optical systems each specifically designed for one set of optical conditions and with such system being readily converted from one condition to the other with an entire absence of a jumping effect.

A still further object of the present invention is the provision of a headlamp system for motor vehicles having a special city driving beam in addition to both a high beam and a low beam of increased illumination.

The foregoing objects of the present invention, together with other objects which will become obvious to those skilled in the art from the following description, are achieved by preferably providing higher wattage single on-focus filaments for both high beam and low beam illumination. Also a suitable switching arrangement is provided whereby the system is changed at will from low beam to high beam, and vice versa, with addition or subtraction of the total illumination in the complete absence of any jumping effect due to a visible beam shift. In addition, a third city beam is provided by the present invention wherein a low wattage off-focus filament is included in the low beam lamps to produce lower wattage illumination for driving in well-lighted, heavy traffic city areas.

Figure 2:
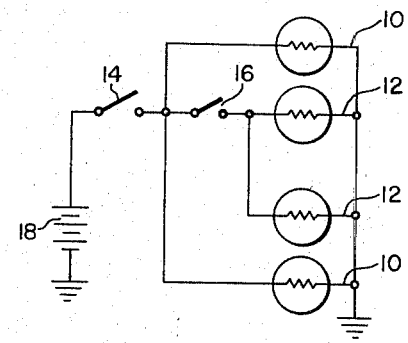
Figure 3:
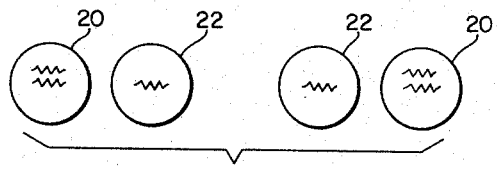
Figure 4:
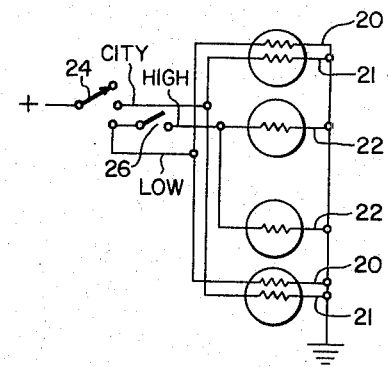
Figure 5:
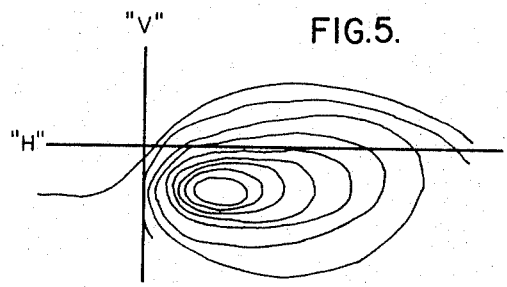
Figure 6:
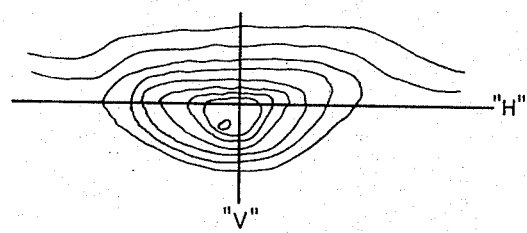

The present invention can be readily understood by reference to the accompanying drawing wherein:

FIG. 1 is a schematic illustration of the headlamp system of the present invention utilizing four single filament on-focus lamps arranged in pairs, FIG. 2 is a circuit diagram showing the energizing circuit and operating switches for causing proper illumination of the headlamps as shown in FIG. 1, FIG. 3 is a schematic illustration of a modification which the headlamp system of the present invention may take in producing a city driving beam, FIG. 4 is a circuit diagram somewhat similar to FIG. 2 but showing the energizing circuit and switching arrangement for the three beam system of FIG. 3, FIG. 5 is an isocandle diagram illustrating the light pattern produced by the low beam lamps in the headlamp system of the present invention, and FIG. 6 is an isocandle diagram illustrating the light pattern produced by the high beam lamps as shown and described herein.

Referring now more specifically to the present invention as illustrated in the drawing, the system as shown in FIG. 1 comprises two pairs of headlamps which are normally disposed on the front of a motor vehicle adjacent the front fenders. The two outboard lamps 10 of each pair in this instance, comprise a seven inch sealed-beam headlamp having an on-focus, high wattage, shielded filament which, together with the increased reflector area of the seven inch lamp, produces greater light flux for low beam illumination and reduces the glare encountered by the operator of an approaching vehicle. The lamps 10 as contemplated by the present invention utilize a 60-watt single filament as opposed to the 50-watt filaments generally employed by conventional dual filament low beam lamps and thus will provide a maximum beam candle power of 38,000 as opposed to a maximum beam candle power of 22,000 generally produced by the dual filament lamps. In addition, a seven inch single filament lamp will better withstand vibration and road shock and is less complex and less expensive to manufacture. The two inboard lamps 12 are of the five and three-quarter inch diameter sealed-beam type and likewise utilize a somewhat higher wattage on-focus filament than lamps of this size and type presently employed. The lamps 12 as contemplated by the present invention utilize a 60 watt single on-focus filament whereas 37.5-watt filaments are most usually found in present day high beam systems. The lens of these inboard headlamps may be clear or optically modified so as to produce the best high beam pattern in conjunction with the higher wattage outboard seven inch lamps which also remain lighted for high beam illumination.

The low beam pattern as produced by the two outboard headlamps 10 is shown in FIG. 5 from which it will be noted that the top edge of the high intensity area is substantially on the horizontal H axis while the left edge of the high intensity area is directed to the right of the vertical V axis. Beam direction as herein described may be accomplished by either directional mounting or prismatic selection as is well known in the automotive lighting art. Accordingly, when the panel switch 14 of FIG. 2 is moved to its closed position and dimmer switch 16 is in its open position only the two outboard low beam headlamps 10 are energized from the usual storage battery 18 thereby producing the low beam illumination. Upon operation of dimmer switch 16 to its closed position the two inboard headlamps 12 are energized thus adding their illumination to that of the already energized low beam lamps 10 to produce high beam highway illumination. The operation of dimmer switch 16 to change from low beam illumination to high beam illumination and back again is accompanied solely by an increasing or decreasing of the total illumination and hence is completely devoid of any jumping effect or visible beam shift inherent in changing from one lamp to another or from one filament to another in the same lamp.

When energized, the two inboard high beam lamps each produce a beam pattern as shown in FIG. 6 wherein it will be observed that the high intensity area is substantially rectangular with the geometric center of this high intensity beam approximately centered at the intersection of the horizontal axis H and the vertical axis V which coincide with the H and V axes of the on-focus filaments of the lamps 12. This improved system accordingly provides better light control due to the utilization of two optical systems which are each specifically designed for one set of operating conditions, with the high wattage, increased reflector area, low beam lamps giving more light flux for illumination along the side of the road, and the high wattage, high beam lamps producing greater improved illumination, with a minimum of glare, when topping a hill or negotiating expressway curves. Presently existing vehicle lighting systems are compromise optical systems which attempt to perform a dual lighting function with dual filament lamps and have an inherent difficulty in maintaining uniform beam patterns.

The modification of the present invention as shown in FIGS. 3 and 4 differs from that previously described merely in the addition of a lower wattage off-focus shielded filament 21 (FIG. 4) mounted in the seven inch outboard lamps 20 to produce a low brightness and glare level beam for illumination in well-lighted, heavy traffic, city areas. This accordingly necessitates an additional contact for the control switch 24 as shown in FIG. 4 so that at its first position it causes energization of this low brightness off-focus city beam filament. Thereafter further operation of the switch 24 to its second position extinguishes the city beam and causes energization of the low beam on-focus filament of the outboard lamps 20 when dimmer switch 26 is in its open position. Closing of dimmer switch 26 causes energization of the inboard lamps 22 and adds the illumination therefrom to that of the low beam lamps 20 for high beam illumination precisely as previously mentioned relative to the operation of the FIG. 2 embodiment.

It should be thus apparent from the foregoing that in accordance with the present invention a headlamp system for motor vehicles has been herein provided having two distinct optical systems in which one produces increased light flux without undue glare for low beam illumination and the other produces increased light flux which is added to the low beam illumination to give high beam illumination without glare for expressway driving. Also, in transition from low beam illumination to high beam illumination and vice versa, there is only an increasing or decreasing of the total light output thus completely eliminating all jumping effect or visible beam shift by operation of a simple energizing and control circuit.

Although some embodiments of the present invention have been herein shown and described it is to be understood that still further modifications thereof may be made without departing from the spirit and scope of the present invention.

I claim as my invention:

1. In a headlamp system for motor vehicles, the combination of:
   (a) a pair of relatively large diameter sealed-beam headlamps each provided with a low wattage off-focus filament for producing a city driving beam and each lamp having a high wattage on-focus filament for producing low beam illumination of a definite pattern directed downwardly and to the right of the motor vehicle,
   (b) a pair of smaller diameter sealed-beam headlamps each disposed adjacent one of said large diameter lamps and provided with a high wattage on-focus filament energizable simultaneously with the high-wattage on-focus filament of said large diameter lamps to produce a high beam for country driving, and
   (c) an energizing circuit having a first switch operable to selectively cause energization of the off-focus filament of said large reflector-surfaced lamps for city driving or of the on-focus filament of such lamps for low beam illumination and a second switch operable to cause energization of said smaller diameter headlamps simultaneously with illumination from the on-focus filaments of said large reflector-surfaced lamps for high beam country driving.

2. In a headlamp system for motor vehicles, the combination of:
   (a) four sealed-beam headlamps each having a relatively high wattage on-focus filament and supported on the front of the motor vehicle with a pair of said headlamps disposed on each side of the center line of said vehicle,
   (b) one lamp of each pair having a relatively large reflecting surface and provided with an off-focus low-wattage filament in addition to said high wattage on-focus filament, said high wattage on-focus filament being operable to produce low beam illumination having a high intensity light area directed downwardly with respect to a horizontal line extending through the filament and to the right of a vertical line through the filament for producing a low beam pattern downwardly and to the right of the motor vehicle,
   (c) the remaining high wattage lamps of each pair being operable when energized to add their illumination to that from the low beam large reflector-surfaced lamps to produce high beam illumination for country driving, and
   (d) an energizing circuit having a first switch operable to selectively energize either the off-focus filament of said large reflector-surfaced lamps for city driving or the on-focus filament of such lamps for low beam illumination, and a second switch operable to cause energization of said remaining high wattage lamps only when said on-focus filaments of said large reflector-surfaced lamps are energized to thereby produce high beam illumination for country driving.

References Cited

UNITED STATES PATENTS 2,170,682    8/1939    Frech et al. _____ 315—83 X
3,325,680    6/1967    Amacher _____ 315—82

DAVID J. GALVIN, *Primary Examiner.*

JAMES W. LAWRENCE, *Examiner.*

R. L. JUDD, *Assistant Examiner.*